(12) United States Patent
O'Keeffe et al.

(10) Patent No.: US 12,372,847 B2
(45) Date of Patent: Jul. 29, 2025

(54) ELECTRICALLY-ACTUATED VARIABLE TRANSMISSION FILM HAVING VERY LOW HAZE AND A VISIBLE GRID IN A CLEAR STATE

(71) Applicant: E INK CORPORATION, Billerica, MA (US)

(72) Inventors: Donal Martin O'Keeffe, Shannon (IE); Timothy O'Keeffe, Shannon (IE)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/921,097

(22) Filed: Oct. 21, 2024

(65) Prior Publication Data
US 2025/0044659 A1    Feb. 6, 2025

Related U.S. Application Data

(63) Continuation of application No. 18/227,073, filed on Jul. 27, 2023, now Pat. No. 12,153,322, which is a
(Continued)

(30) Foreign Application Priority Data

Sep. 30, 2019 (GB) .................................... 1914105
Oct. 16, 2019 (GB) .................................... 1914933

(51) Int. Cl.
*G09G 3/34*    (2006.01)
*G02F 1/133*    (2006.01)
*G02F 1/167*    (2019.01)

(52) U.S. Cl.
CPC .......... *G02F 1/167* (2013.01); *G02F 1/13306* (2013.01); *G09G 3/344* (2013.01); *G02F 2203/01* (2013.01)

(58) Field of Classification Search
CPC .. G02F 1/167; G02F 2203/01; G02F 2203/48; G09G 3/344; B32B 17/10522
See application file for complete search history.

(56) References Cited

U.S. PATENT DOCUMENTS 4,418,346 A    11/1983    Batchelder
5,115,346 A    5/1992    Lynam
(Continued)

FOREIGN PATENT DOCUMENTS

CN    1828350 A    9/2006
CN    103834285 A    6/2014
(Continued)

OTHER PUBLICATIONS

Kitamura, T. et al., "Electrical toner movement for electronic paper-like display", Asia Display/IDW '01, pp. 1517-1520, Paper HCS1-1 (2001).
(Continued)

*Primary Examiner* — Sanghyuk Park
(74) *Attorney, Agent, or Firm* — Brian D. Bean

(57) ABSTRACT

A light attenuator that provides transparent light states and absorbing dark states for use in selectively controlling light, especially for smart glass applications. The light attenuator includes abutting areas of attenuation and transparency that form a repeat pattern or a quasi-repeat pattern. The attenuating areas are visible when the light attenuator is in the light state, but the repeat pattern is sufficiently large that a viewer looks through the attenuator and sees no haze.

6 Claims, 3 Drawing Sheets

Related U.S. Application Data continuation of application No. 17/975,735, filed on Oct. 28, 2022, now Pat. No. 11,762,258, which is a continuation of application No. 17/034,998, filed on Sep. 28, 2020, now Pat. No. 11,520,210.

(56) References Cited

U.S. PATENT DOCUMENTS

| | | |
|---|---|---|
| 5,784,136 A | 7/1998 | Ando et al. |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,067,185 A | 5/2000 | Albert et al. |
| 6,120,588 A | 9/2000 | Jacobson |
| 6,120,839 A | 9/2000 | Comiskey et al. |
| 6,130,774 A | 10/2000 | Albert et al. |
| 6,144,361 A | 11/2000 | Gordon, II |
| 6,184,856 B1 | 2/2001 | Gordon, II |
| 6,225,971 B1 | 5/2001 | Gordon, II |
| 6,241,921 B1 | 6/2001 | Jacobson et al. |
| 6,262,706 B1 | 7/2001 | Albert et al. |
| 6,262,833 B1 | 7/2001 | Loxley et al. |
| 6,271,823 B1 | 8/2001 | Gordon, II |
| 6,300,932 B1 | 10/2001 | Albert |
| 6,323,989 B1 | 11/2001 | Jacobson et al. |
| 6,327,072 B1 | 12/2001 | Comiskey et al. |
| 6,377,387 B1 | 4/2002 | Duthaler et al. |
| 6,392,786 B1 | 5/2002 | Albert |
| 6,459,418 B1 | 10/2002 | Comiskey et al. |
| 6,515,649 B1 | 2/2003 | Albert et al. |
| 6,538,801 B2 | 3/2003 | Jacobson et al. |
| 6,580,545 B2 | 6/2003 | Morrison et al. |
| 6,623,662 B2 | 9/2003 | Wang et al. |
| 6,639,580 B1 | 10/2003 | Kishi |
| 6,693,620 B1 | 2/2004 | Herb et al. |
| 6,721,083 B2 | 4/2004 | Jacobson et al. |
| 6,727,881 B1 | 4/2004 | Albert et al. |
| 6,798,470 B2 | 9/2004 | Iwanaga |
| 6,822,782 B2 | 11/2004 | Honeyman et al. |
| 6,831,771 B2 | 12/2004 | Ho et al. |
| 6,839,158 B2 | 1/2005 | Albert et al. |
| 6,866,760 B2 | 3/2005 | Paolini, Jr. et al. |
| 6,870,661 B2 | 3/2005 | Pullen et al. |
| 6,914,713 B2 | 7/2005 | Chung et al. |
| 6,922,276 B2 | 7/2005 | Zhang et al. |
| 6,927,892 B2 | 8/2005 | Ho et al. |
| 6,950,220 B2 | 9/2005 | Abramson et al. |
| 6,956,690 B2 | 10/2005 | Yu et al. |
| 6,958,848 B2 | 10/2005 | Cao et al. |
| 6,958,849 B2 | 10/2005 | Chen et al. |
| 6,982,178 B2 | 1/2006 | LeCain et al. |
| 6,987,603 B2 | 1/2006 | Paolini, Jr. et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,038,655 B2 | 5/2006 | Herb et al. |
| 7,052,766 B2 | 5/2006 | Zang et al. |
| 7,072,095 B2 | 7/2006 | Liang et al. |
| 7,075,502 B1 | 7/2006 | Drzaic et al. |
| 7,079,305 B2 | 7/2006 | Paolini, Jr. et al. |
| 7,110,162 B2 | 9/2006 | Wu et al. |
| 7,110,164 B2 | 9/2006 | Paolini, Jr. et al. |
| 7,113,323 B2 | 9/2006 | Ho et al. |
| 7,116,318 B2 | 10/2006 | Amundson et al. |
| 7,116,466 B2 | 10/2006 | Whitesides et al. |
| 7,141,688 B2 | 11/2006 | Feng et al. |
| 7,142,351 B2 | 11/2006 | Chung et al. |
| 7,144,942 B2 | 12/2006 | Zang et al. |
| 7,170,670 B2 | 1/2007 | Webber |
| 7,180,649 B2 | 2/2007 | Morrison et al. |
| 7,184,197 B2 | 2/2007 | Liang et al. |
| 7,202,991 B2 | 4/2007 | Zhang et al. |
| 7,224,511 B2 | 5/2007 | Takagi |
| 7,226,550 B2 | 6/2007 | Hou et al. |
| 7,226,966 B2 | 6/2007 | Kambe et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,247,379 B2 | 7/2007 | Pullen et al. |
| 7,256,766 B2 | 8/2007 | Albert et al. |
| 7,277,218 B2 | 10/2007 | Hwang et al. |
| 7,286,279 B2 | 10/2007 | Yu et al. |
| 7,304,634 B2 | 12/2007 | Albert et al. |
| 7,307,779 B1 | 12/2007 | Cernasov |
| 7,312,784 B2 | 12/2007 | Baucom et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,382,514 B2 | 6/2008 | Hsu et al. |
| 7,387,858 B2 | 6/2008 | Chari et al. |
| 7,390,901 B2 | 6/2008 | Yang et al. |
| 7,405,865 B2 | 7/2008 | Ogiwara |
| 7,411,719 B2 | 8/2008 | Paolini, Jr. et al. |
| 7,420,549 B2 | 9/2008 | Jacobson et al. |
| 7,432,907 B2 | 10/2008 | Goden |
| 7,453,445 B2 | 11/2008 | Amundson |
| 7,473,782 B2 | 1/2009 | Yang et al. |
| 7,477,444 B2 | 1/2009 | Cao et al. |
| 7,507,449 B2 | 3/2009 | Chari et al. |
| 7,532,389 B2 | 5/2009 | Li et al. |
| 7,535,624 B2 | 5/2009 | Amundson et al. |
| 7,560,004 B2 | 7/2009 | Pereira et al. |
| 7,561,324 B2 | 7/2009 | Duthaler et al. |
| 7,572,394 B2 | 8/2009 | Gu et al. |
| 7,576,904 B2 | 8/2009 | Chung et al. |
| 7,580,180 B2 | 8/2009 | Ho et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 7,848,006 B2 | 12/2010 | Wilcox et al. |
| 7,848,007 B2 | 12/2010 | Paolini, Jr. et al. |
| 7,903,319 B2 | 3/2011 | Honeyman et al. |
| 7,910,175 B2 | 3/2011 | Webber |
| 7,929,198 B2 | 4/2011 | Lipovetskaya et al. |
| 7,951,938 B2 | 5/2011 | Yang et al. |
| 7,952,790 B2 | 5/2011 | Honeyman et al. |
| 7,955,532 B2 | 6/2011 | Liang et al. |
| 7,957,054 B1 | 6/2011 | Yeo et al. |
| 7,986,297 B2 | 7/2011 | Ohshima et al. |
| 7,999,787 B2 | 8/2011 | Amundson et al. |
| 8,009,348 B2 | 8/2011 | Zehner et al. |
| 8,018,640 B2 | 9/2011 | Whitesides et al. |
| 8,018,642 B2 | 9/2011 | Yeo et al. |
| 8,035,886 B2 | 10/2011 | Jacobson |
| 8,054,535 B2 | 11/2011 | Sikharulidze et al. |
| 8,089,687 B2 | 1/2012 | Mabeck et al. |
| 8,115,729 B2 | 2/2012 | Danner et al. |
| 8,119,802 B2 | 2/2012 | Moonen et al. |
| 8,129,655 B2 | 3/2012 | Jacobson et al. |
| 8,179,590 B1 | 5/2012 | Mabeck et al. |
| 8,183,757 B2 | 5/2012 | Mabeck et al. |
| 8,184,357 B2 | 5/2012 | Yeo et al. |
| 8,257,614 B2 | 9/2012 | Gu et al. |
| 8,270,064 B2 | 9/2012 | Feick et al. |
| 8,305,341 B2 | 11/2012 | Arango et al. |
| 8,319,759 B2 | 11/2012 | Jacobson et al. |
| 8,331,014 B2 | 12/2012 | Liu et al. |
| 8,331,016 B2 | 12/2012 | Shitagami et al. |
| 8,363,306 B2 | 1/2013 | Du et al. |
| 8,384,659 B2 | 2/2013 | Yeo et al. |
| 8,390,918 B2 | 3/2013 | Wilcox et al. |
| 8,432,598 B2 | 4/2013 | Yeo et al. |
| 8,446,664 B2 | 5/2013 | Chen et al. |
| 8,582,196 B2 | 11/2013 | Walls et al. |
| 8,654,436 B1 | 2/2014 | Feick |
| 8,699,120 B2 | 4/2014 | Kim et al. |
| 8,730,561 B2 | 5/2014 | Kim et al. |
| 8,810,895 B2 | 8/2014 | No et al. |
| 8,896,906 B2 | 11/2014 | Zhou et al. |
| 8,902,491 B2 | 12/2014 | Wang et al. |
| 8,961,831 B2 | 2/2015 | Du et al. |

(56) References Cited

U.S. PATENT DOCUMENTS

| | | |
|---|---|---|
| 8,964,275 B2 | 2/2015 | Kim et al. |
| 9,005,494 B2 | 4/2015 | Valianatos et al. |
| 9,052,564 B2 | 6/2015 | Sprague et al. |
| 9,104,083 B2 | 8/2015 | Tamoto et al. |
| 9,114,663 B2 | 8/2015 | Ho et al. |
| 9,158,174 B2 | 10/2015 | Walls |
| 9,217,906 B2 | 12/2015 | Yeo et al. |
| 9,244,326 B2 | 1/2016 | Zhou et al. |
| 9,279,906 B2 | 3/2016 | Kang |
| 9,341,915 B2 | 5/2016 | Yang et al. |
| 9,348,193 B2 | 5/2016 | Hiji et al. |
| 9,361,836 B1 | 6/2016 | Telfer et al. |
| 9,366,935 B2 | 6/2016 | Du et al. |
| 9,372,380 B2 | 6/2016 | Du et al. |
| 9,382,427 B2 | 7/2016 | Du et al. |
| 9,423,666 B2 | 8/2016 | Wang et al. |
| 9,428,649 B2 | 8/2016 | Li et al. |
| 9,441,122 B2 | 9/2016 | Zhou et al. |
| 9,557,623 B2 | 1/2017 | Wang et al. |
| 9,567,995 B2 | 2/2017 | Briggs et al. |
| 9,645,467 B2 | 5/2017 | Yokokawa et al. |
| 9,658,373 B2 | 5/2017 | Downing |
| 9,664,978 B2 | 5/2017 | Arango et al. |
| 9,670,367 B2 | 6/2017 | Li et al. |
| 9,688,859 B2 | 6/2017 | Yezek et al. |
| 9,726,957 B2 | 8/2017 | Telfer et al. |
| 9,777,201 B2 | 10/2017 | Widger et al. |
| 9,778,537 B2 | 10/2017 | Wang et al. |
| 9,816,501 B2 | 11/2017 | Briggs et al. |
| 9,835,926 B2 | 12/2017 | Sprague et al. |
| 9,921,451 B2 | 3/2018 | Telfer et al. |
| 10,067,398 B2 | 9/2018 | O'Keeffe |
| 10,106,018 B2 | 10/2018 | Martens et al. |
| 10,144,275 B2 | 12/2018 | Gaddis et al. |
| 10,324,353 B2 | 6/2019 | O'Keeffe |
| 10,372,008 B2 | 8/2019 | Telfer et al. |
| 10,509,242 B2 | 12/2019 | O'Keeffe |
| 10,656,493 B2 | 5/2020 | Heikenfeld et al. |
| 10,761,395 B2 | 9/2020 | Du et al. |
| 10,809,590 B2 | 10/2020 | Widger et al. |
| 10,824,025 B2 | 11/2020 | O'Keeffe |
| 10,852,615 B2 | 12/2020 | Koch et al. |
| 10,926,859 B2 | 2/2021 | Beard et al. |
| 10,935,818 B2 | 3/2021 | Lam et al. |
| 10,983,410 B2 | 4/2021 | Widger et al. |
| 11,098,206 B2 | 8/2021 | Wu et al. |
| 11,174,328 B2 | 11/2021 | Abbott, Jr. et al. |
| 11,454,855 B2 | 9/2022 | Abbott, Jr. et al. |
| 2003/0048522 A1 | 3/2003 | Liang et al. |
| 2003/0151029 A1 | 8/2003 | Hsu et al. |
| 2003/0164480 A1 | 9/2003 | Wu et al. |
| 2004/0030125 A1 | 2/2004 | Li et al. |
| 2004/0135764 A1* | 7/2004 | Takeda ............... G02F 1/1679 345/107 |
| 2004/0223209 A1* | 11/2004 | Endo ..................... G03G 17/00 359/296 |
| 2005/0012980 A1 | 1/2005 | Wilcox et al. |
| 2005/0156340 A1 | 7/2005 | Valianatos et al. |
| 2005/0195470 A1* | 9/2005 | Takeda ............... G02F 1/1333 359/296 |
| 2007/0091417 A1 | 4/2007 | Cao et al. |
| 2007/0171510 A1* | 7/2007 | Yamazaki ............ G02F 1/1675 359/296 |
| 2009/0009852 A1 | 1/2009 | Honeyman et al. |
| 2009/0122389 A1 | 5/2009 | Whitesides et al. |
| 2009/0206499 A1 | 8/2009 | Whitesides |
| 2010/0148385 A1 | 6/2010 | Balko et al. |
| 2011/0217639 A1 | 9/2011 | Sprague |
| 2011/0286081 A1 | 11/2011 | Jacobson |
| 2012/0049125 A1 | 3/2012 | Du et al. |
| 2012/0118198 A1 | 5/2012 | Zhou |
| 2013/0161565 A1 | 6/2013 | Laxton |
| 2013/0193385 A1 | 8/2013 | Li et al. |
| 2013/0244149 A1 | 9/2013 | Wang et al. |
| 2014/0011913 A1 | 1/2014 | Du et al. |
| 2014/0078024 A1 | 3/2014 | Paolini, Jr. et al. |
| 2014/0078576 A1 | 3/2014 | Sprague |
| 2014/0078857 A1 | 3/2014 | Nelson |
| 2014/0104674 A1 | 4/2014 | Ting et al. |
| 2014/0231728 A1 | 8/2014 | Du et al. |
| 2014/0293399 A1 | 10/2014 | Kimura et al. |
| 2015/0177590 A1 | 6/2015 | Laxton |
| 2015/0185509 A1 | 7/2015 | Wang et al. |
| 2015/0277205 A1 | 10/2015 | Kawahara et al. |
| 2015/0301425 A1 | 10/2015 | Du et al. |
| 2016/0170106 A1 | 6/2016 | Wang et al. |
| 2018/0031942 A1 | 2/2018 | Koch et al. |
| 2018/0129080 A1* | 5/2018 | O'Keeffe ............. G02B 26/005 |
| 2022/0282567 A1 | 9/2022 | Koch |

FOREIGN PATENT DOCUMENTS

| | | |
|---|---|---|
| JP | 2003222913 A | 8/2003 |
| JP | 2004163818 A | 6/2004 |
| KR | 20130078094 A | 7/2013 |
| KR | 20160052092 A | 5/2016 |
| WO | 1999010767 A1 | 3/1999 |
| WO | 2019021578 A1 | 1/2019 |

OTHER PUBLICATIONS

Yamaguchi, Y. et al., "Toner display using insulative particles charged triboelectrically", Asia Display/IDW '01, pp. 1729-1730, Paper AMD4-4 (2001).

United Kingdom Intellectual Property Office, "Combined Search and Examination Report under Sections 17 and 18(3)", Application No. GB1914933.5, Apr. 16, 2020.

European Patent Office, "Extended European Search Report", EP Appl. No. 20870482.5-1210, Sep. 5, 2023.

Korean Intellectual Property Office, "International Search Report and Written Opinion", PCT/US2020/053110, Jan. 15, 2021.

Wang, D.W. et al., "Microencapsulated electric ink using gelatin/gum arabic", Journal of Microencapsulation, vol. 26:1, pp. 37-45, (2009).

\* cited by examiner 0.5M viewing distance

ELECTRICALLY-ACTUATED VARIABLE TRANSMISSION FILM HAVING VERY LOW HAZE AND A VISIBLE GRID IN A CLEAR STATE

RELATED APPLICATIONS

This application is a continuation of U.S. patent application Ser. No. 18/227,073, filed July 27, which is a continuation of U.S. patent application Ser. No. 17/975,735, filed Oct. 28, 2022, now U.S. Pat. No. 11,762,258, which is a continuation of U.S. patent application Ser. No. 17/034,998, filed Sep. 28, 2020, now U.S. Pat. No. 11,520,210, which claims priority to Great Britain Patent Application No. 1914105.0, filed Sep. 30, 2019 and to Great Britain Patent Application No. 1914933.5, filed Oct. 16, 2019. All references, patents, and patent applications disclosed herein are incorporated by reference in their entireties.

The present invention relates to an electrophoretic device having a construction that provides transparent light states for use in selectively controlling light, especially for smart glass applications.

BACKGROUND TO THE INVENTION

There is a need for an electrically switchable, electrophoretic device that in one or more light states is transparent to visible light and provides glass-like quality and in other light states strongly attenuates light. Glass-like quality includes providing very good clarity and light transmission, very low haze, minimal perception of hue in the transparent state, and minimal diffraction. In the prior art, the available electrophoretic solutions have limitations on their functionality in some cases and inherent technological obstacles in others.

In the applicant's EP2976676 the size of apertures (transparent areas) and obstructions (light blocking areas) have their maximum size and pitch determined by the resolution of a typical viewer's eye such that apertures and obstructions are sufficiently small that their geometric form in a face view is not apparent. In examples in the document of its transparent state its black charged particles are concentrated and surround discrete transparent apertures, the maximum angle subtended by an aperture to a viewer at a required viewing distance is one arcminute (corresponding to 290 microns at a viewing distance of 1 meter) and preferably 0.6 arcminutes (corresponding to 174.5 microns at 1 meter). The subtended angle of the aperture pitch (i.e. aperture and concentrated charged particle area) can be double these limits, but only to the extent that the geometric forms are not apparent on a face view.

Similarly, in the applicant's EP3281055 it is stated that the device (including smart windows) has solid polymer structures embedded in its viewing area and the structures are on the scale of microstructure and are invisible to the eye. An example is given of a smart glass device with a cavity pitch of 250 microns. If viewing only from a long distance the document allows the cavities to be up to 1,000 microns in theory, however, the document constrains the microstructures to be not visible in use. The limiting constraint is similar to the earlier EP2976676 and is stated as the maximum angle subtended by a micro-fastener portion to a viewer at a required viewing distance is one arc minute and preferably 0.6 arc minutes.

In U.S. Pat. No. 8,183,757 it is stated that when the colorant particles are collected in the reservoir regions, the colorant particles may tint the visible areas. The tint caused by the colorant particles may prevent a neutral white or clear optical state for the displays. Devices used an opaque layer on the second electrode within each recess region. The black opaque layer in the recesses (or reservoirs) masks the coloured collected particles. In related U.S. Pat. No. 8,384,659 a hexagonal reservoir is shown in FIG. 2E and its radius is 67.5 microns.

In the transparent light states of prior art devices there is a perceivable tint corresponding to the colour of the charged particles in the electrophoretic ink. A viewer's perception of tint, including black tint, is one of a uniform tinting due to the micron scale, discrete distribution, and dense distribution of apertures or obstructions analogous to halftone print on paper or colour displays. The latter's pixel density is sufficiently high to ensure that individual pixels cannot be resolved even when viewed up close and that the light from adjacent pixels is integrated by the eye of a viewer seamlessly.

SUMMARY OF THE INVENTION

In embodiments a light attenuator (200, 203, 204) comprising a cell (300, 303, 304) having a first transparent substrate (190) and a second transparent substrate (190) defining respective viewing faces (150, 153, 154) and with opposite major surfaces (i.e. juxtaposed parallel) having transparent electrodes (160) and spaced apart (by dimension 5) to provide a volume there between, said volume containing transparent polymer structure (100, 103, 104) and electrophoretic ink (1, 2, 3), said ink comprising charged particles (10, 11, 12) dispersed in a transparent fluid (15, 16, 17), said charged particles are responsive to an electric field applied to said electrodes to move between: a first extreme light state in which particles are maximally spread within said cell to lie in the path of sunlight through the cell attenuating the sunlight and a second extreme light state in which said particles are maximally concentrated within the cell in locations (130, 133, 134) defined by said polymer structure to remove them from the path of sunlight through the cell transmitting the sunlight and providing visual access, and in said second light state a viewing face of said light attenuator has a visible pattern of attenuating areas (20, 24) abutted on transparent areas (30, 34) defined by the presence and absence respectively of said concentrated particles, wherein each of said abutted areas has a dimension (50, 55, 60, 65) that is 0.3 mm or more, and the centre-to-centre distance of adjacent attenuating areas (40, 41) or the centre-to-centre distance of adjacent transparent areas (45, 46) is 0.6 mm or more.

Each of said areas in said pattern subtends an angle (80, 90) of more than two arc minutes at a distance of 0.5M from said viewing face (150) and a pair of said abutted areas subtend more than four arc minutes (70).

In some embodiments the pattern is a repeating pattern and said centre-to-centre distances are the same as the pitch. The repeating pattern is a switchable grid that is visible in said second light state and indistinguishable in said first light state. In some embodiments the shortest distance or width (61) of said transparent areas is 75% or more of said pitch and the shortest distance (51) of the attenuating areas is 25% or less. Preferably the limits for the preceding rule are 80% and 20% respectively and more preferably 85% and 15%.

The transparent area in said face view of an embodiment is 60% or more of the total active (i.e., switchable) area, preferably 62% or more, more preferably 65% or more, and most preferably 70% or more, and said visible pattern comprises discontiguous and/or contiguous areas and is perceivable as a pattern of attenuating areas. The visible pattern is superposed on said visual access. The colour of the pattern or grid is the colour of said charged particles. Preferably, the superposed visible pattern or grid is designed to be aesthetically acceptable (or pleasing) by selecting the design of the locations of said concentrated charged particles in said polymer structure.

One of said areas is either: monodisperse or has a distribution of sizes and/or shapes, and preferably the shape of said areas is selected to minimize the opportunities for moiré patterns in said visual access and includes selecting shapes whose borders are defined by applying a modulation function to a geometric shape.

In some embodiments the centre-to-centre distance of adjacent attenuating areas and the centre-to-centre distance of adjacent transparent areas is 0.6 mm or more.

In some embodiments the centre-to-centre distance is in order of preference: 0.62 mm or more, 0.65 mm or more, 0.7 mm or more, 0.8 mm or more, 1.0 mm or more, and most preferably 1.25 mm or more. In correspondence to the preceding, the abutting attenuating areas and transparent areas each have one or more dimensions that are in order of preference: 0.31 mm or more, 0.325 mm or more, 0.35 mm or more, 0.4 mm or more, 0.5 mm or more, and most preferably 0.625 mm or more.

The charged particles have colourant including one or more of: a dye colorant, a pigment colourant, a strongly light scattering material, a strongly reflecting material, or a strongly absorbing material, and particles can be any colour including black or white.

The polymer structure spaces apart said substrates and divides said volume into a monolayer of discrete cavities having polymer walls and filled with said electrophoretic ink, and preferably said polymer structure includes a sealing layer sealing the ink within the cavities.

In some embodiments a colour layer is selectively applied to said polymer walls so that in said viewing face the colour of the wall area matches the colour of said charged particles.

In embodiments the locations of said concentrated charged particles are at said polymer walls, or the locations of said concentrated charged particles are in discrete reservoirs in said polymer structure and the locations do not coincide with said walls, or the locations of said concentrated charged particles are in depressions or channels between protrusions in said polymer structure and the locations may or may not coincide with said walls.

The electrophoretic ink has two or more charged particle types including: positively charged, negatively charged, differing electrophoretic mobility, and/or different colours.

The electrophoretic ink has two charged particles types each with an electrophoretic mobility and colour different to the other but the same charge polarity, and in the second light state said two types segregate as they concentrate at said locations with one type masking the other with respect to one of said viewing faces.

Preferably light attenuators provide at least one light state intermediate the first and second states by moving the charged particles between the concentrating locations in the polymer structure and the opposite electrode to vary the degree of concentrating or spreading respectively.

A device including one of: a window, a mirror, a light shutter, a light modulator, a variable light transmittance sheet, a variable light absorptance sheet, a variable light reflectance sheet, an electrophoretic sun visor for a vehicle, or a see-through display, incorporating the light attenuator.

BRIEF DESCRIPTION OF THE DRAWINGS

Embodiments of the invention will now be described, by way of example, with reference to the accompanying drawings, in which.

DETAILED DESCRIPTION

Embodiments achieve improved optical quality in its electrophoretic light attenuators by making its particles visible as a pattern, or grid-like structure, or array, in its transparent light state. In this state the coloured charged particles are concentrated in defined areas by a transparent polymer structure so that areas in between transmit light. In the prior art neither the concentrated particle areas nor the transparent areas were resolvable, but, in embodiments both areas can be resolved as distinct by eye from at least IM away. Embodiments minimize the integration of both areas by a viewer so that the scene viewed through the attenuator is significantly less tainted with the colour of, or haze from, the charged particles. A viewer's perception of the face of an embodiment is of clear glass with a coloured grid (or array) structure. The latter can be selected to be aesthetically pleasing. Furthermore, by selecting the scale of the pattern or grid-like structure (or array) to be visible, a light attenuator made with white particles does not appear to be hazy, rather, it appears as a foreground white grid superposed on the background scene. In addition, diffraction of light is greatly reduced by using a visible scale for the design of the transparent light state.

Figure 1A:
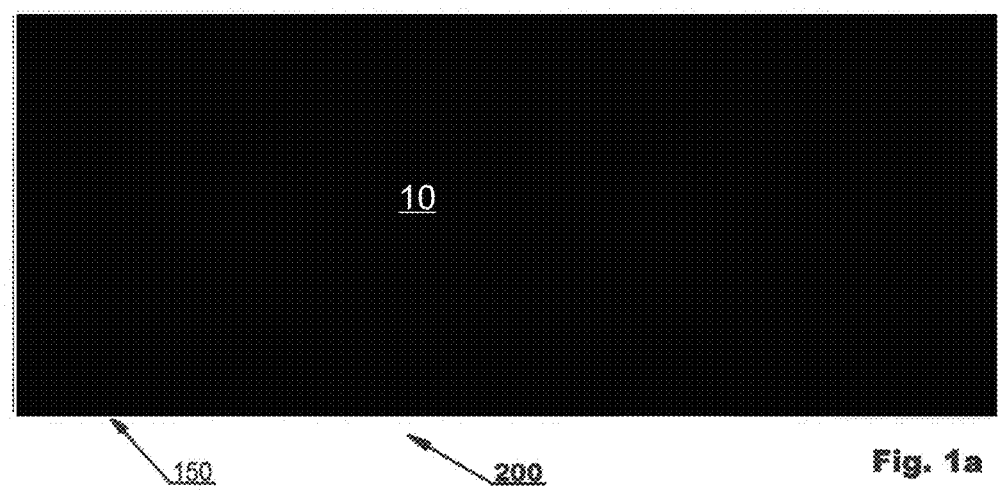
FIG. 1a shows embodiment 200 in a first light state. The drawing shows a view of its face.
Figure 1B:
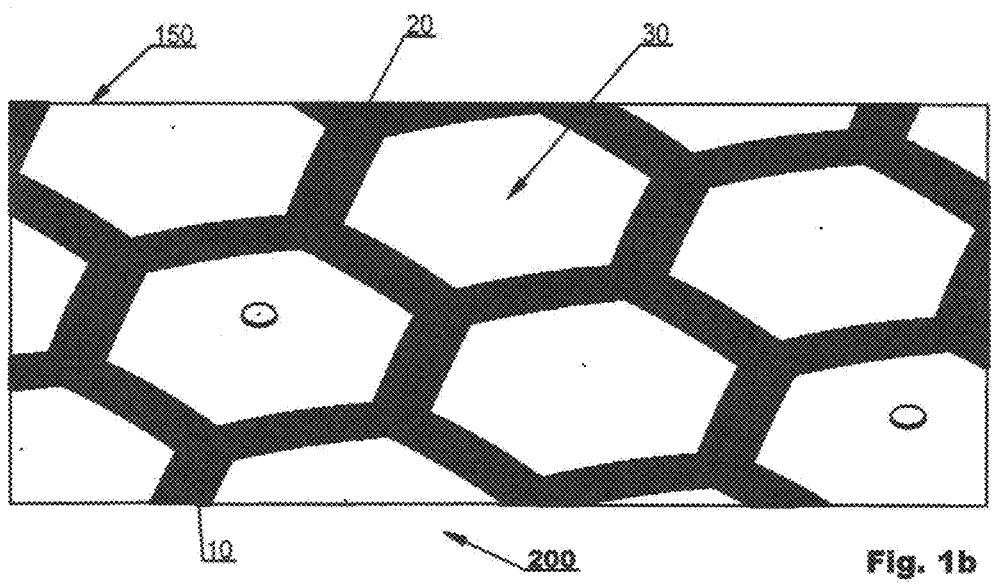
FIG. 1b shows embodiment 200 in a second light state and is three-dimensional view of its face.
Figure 1C:
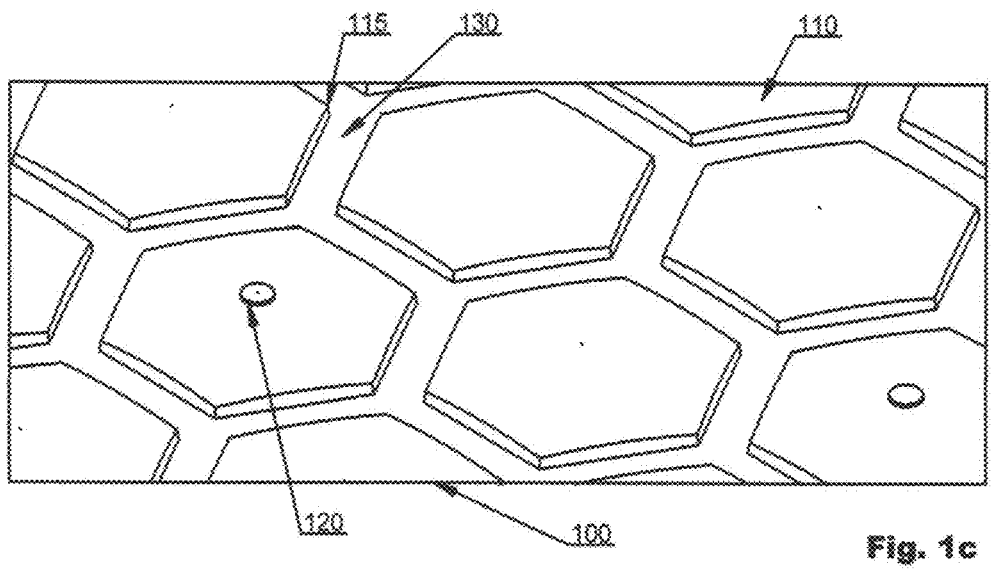
FIG. 1c shows polymer structure 100 and is a three-dimensional view of its face.
Figure 2A:
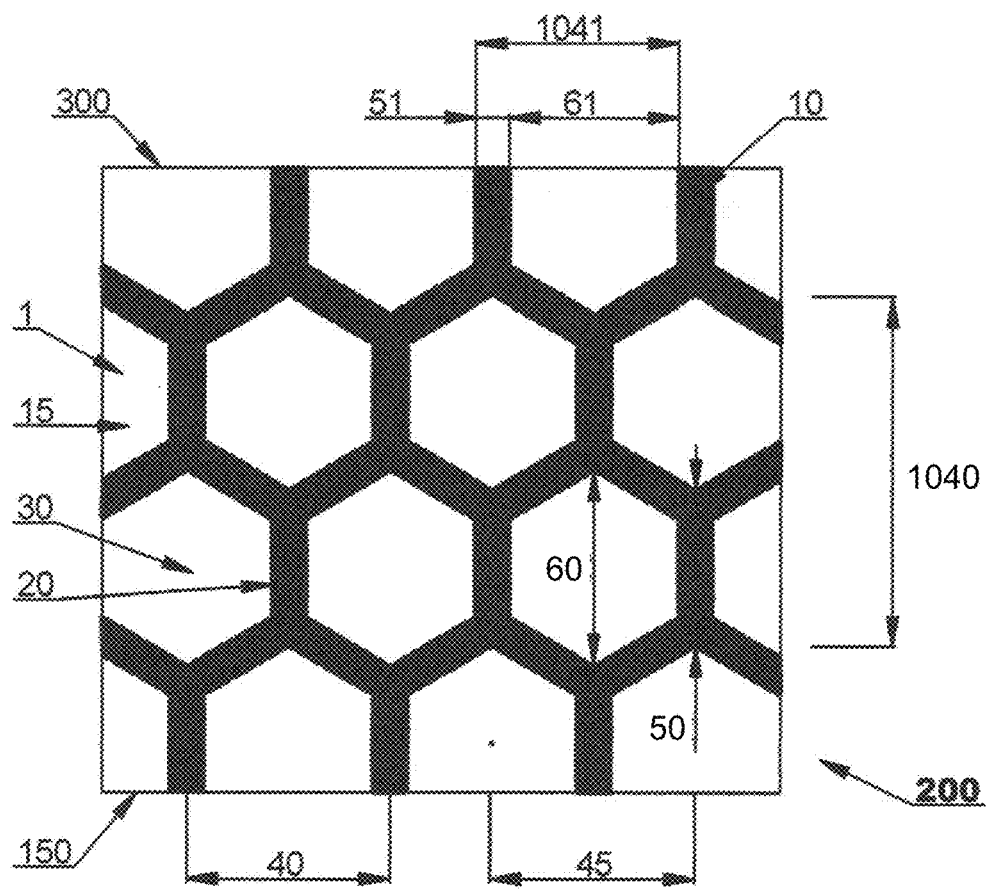
FIG. 2a shows embodiment 200 in a second light state and is a face view.
Figure 2B:
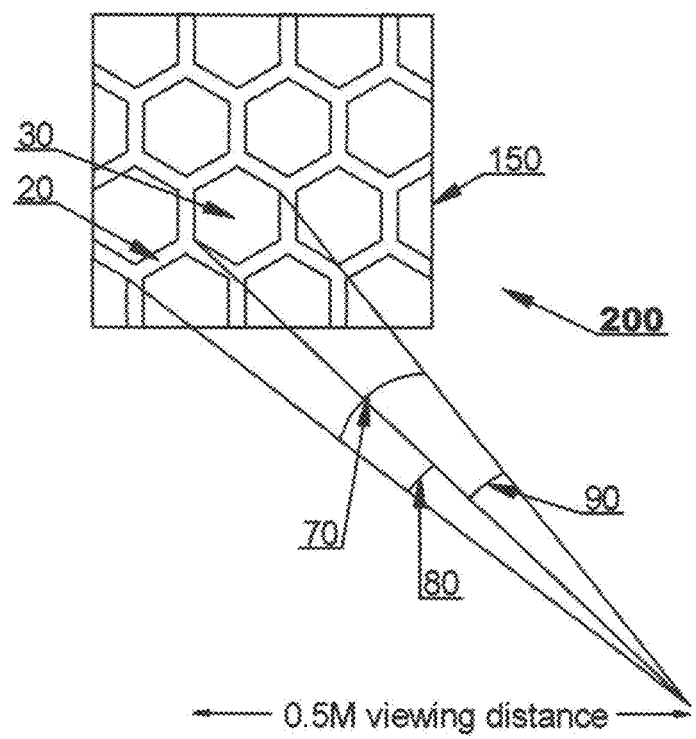
FIG. 2b shows embodiment 200 in a second light state and is a face view.
Figure 3:
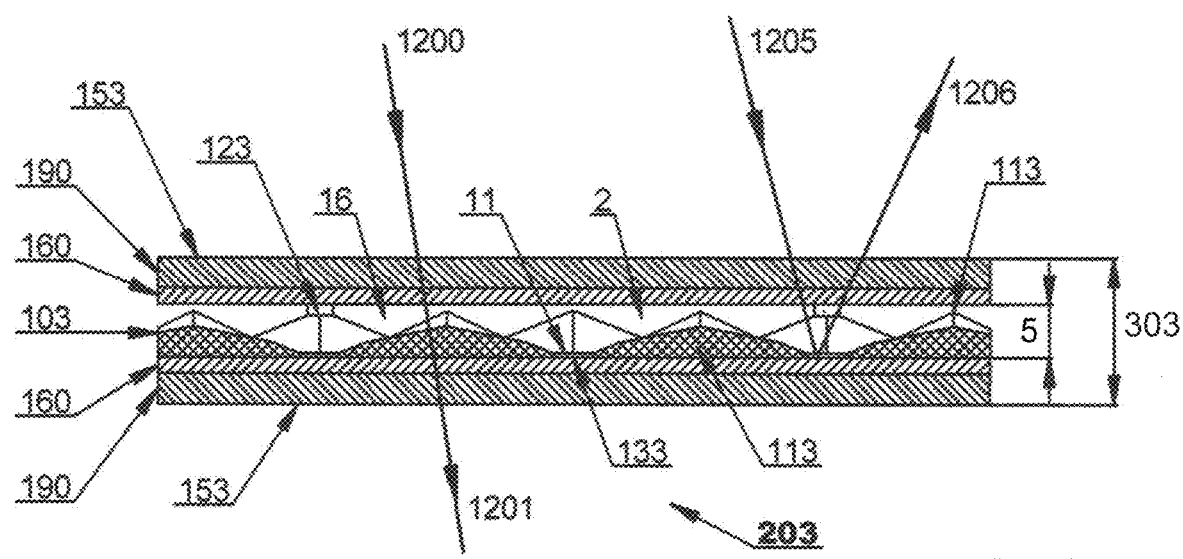
FIG. 3 shows embodiment 203 in a second light state and is a cross sectional view.
Figure 4:
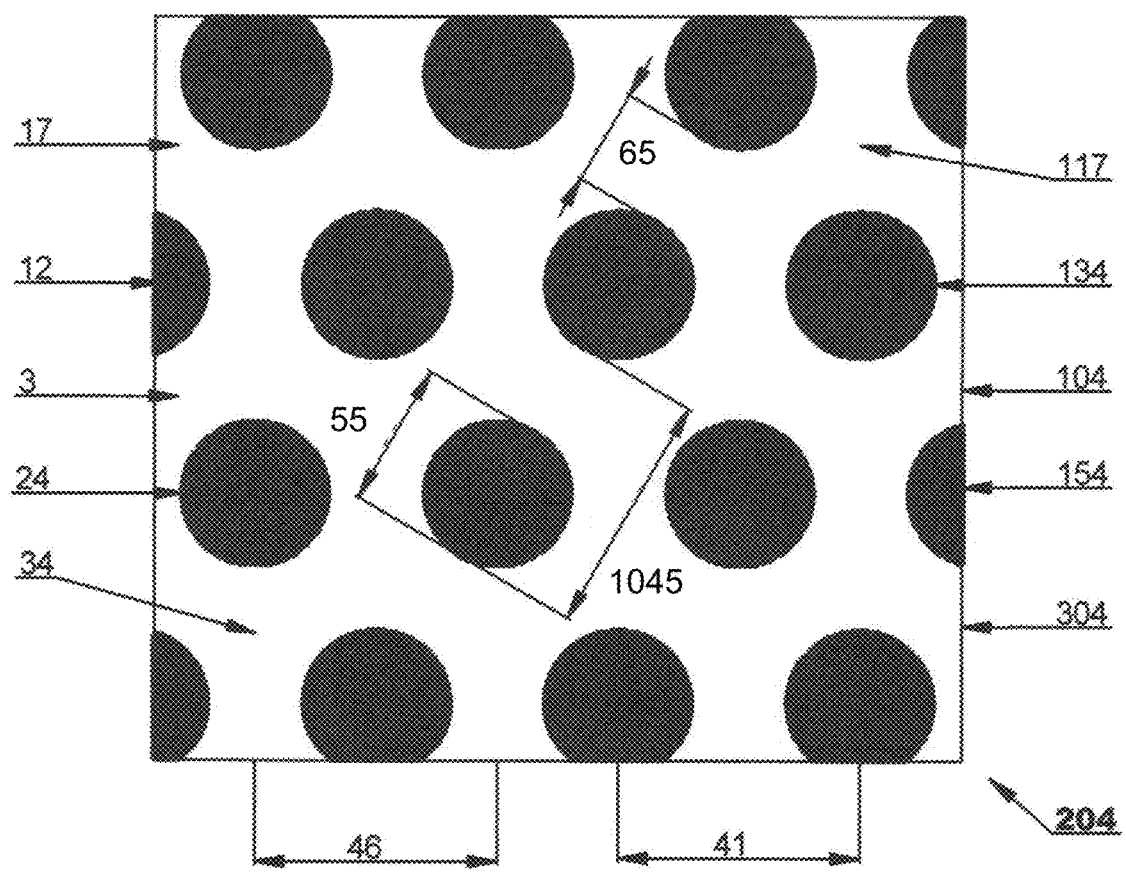
FIG. 4 shows embodiment 204 in a second light state and is a face view.

Embodiments are described with reference to the drawings. In FIGS. 1a to 1c and FIGS. 2a and 2b different features of the same light attenuator (200) are shown in face views. FIG. 1a shown the strongly light attenuating first light state, and FIGS. 1b, 2a and 2b show the transparent second light state. FIG. 1c shows the polymer structure of embodiment (200). FIG. 3 shows embodiment (203) in cross section and is similar to embodiment (200). In these embodiments the second light state results from the electrophoretic ink's charged particles (10, 11) being concentrated in channels (130, 133) between protrusions (110, 113) in the polymer structure (100, 103) by an applied electrical field. FIG. 4 shows the face view of an alternative embodiment (204) that has a different layout of its polymer structure (104) such that its charged particles (12) move across the polymer surface (117) to concentrate in discrete reservoirs or pits (134) in the second light state.

In the figures the light attenuators (200, 203, 204) of embodiments comprise an electrophoretic cell (300, 303, 304) that has two transparent substrates (190) with each coated on one side with a transparent electrode (160). The electrodes' major surfaces face each other and are juxtaposed parallel as shown in FIG. 3. The opposite surfaces of the substrates form the viewing faces (150, 153, 154) of the cells. The substrates are spaced apart and the volume between them is the electro-optical layer of the device. The dimension indicating the spacing apart is (5) and is shown in FIG. 3. In some embodiments dimension (5) defines the cell gap. The electro-optical layer (or volume) comprises transparent polymer structure (100, 103, 104) and electrophoretic ink (1, 2, 3). The electrophoretic ink comprises charged particles (10, 11, 12) dispersed in an otherwise transparent fluid (15, 16, 17). The charged particles can be any colour including black (11), white (12) or red (13). The particles respond to an electric field applied to the electrodes to move between light states bounded by two extremes. In the first extreme light state, shown in FIG. 1a, particles are maximally spread within the cell to lie in the path of sunlight through the cell so that the sunlight is attenuated and the viewing faces are the colour of the particles. The first extreme light state corresponds to a spread state or maximum attenuating or obscuring or hiding state.

In the second extreme light state (shown in FIGS. 1b, 2a, 2b, 3 and 4) the particles are maximally concentrated within the cell in locations (130, 133, 134) defined by the polymer structure (100, 103, 104). FIG. 1c shows a three-dimensional view of the polymer structure (100). Channel (130) forms an interconnected depression or space between discrete protrusions (110) to confine concentrated particles (10) in the second light state. Concentrated particles can fill the channel up to the level indicated by (115). This removes the particles from the path of sunlight through the cell so that the sunlight is transmitted without a colour hue (i.e., transmitted without encountering coloured particles) and the cell is see-through providing visual access through an opening incorporating the embodiment.

The second light state of cell (303) shown in FIG. 3 shows light ray (1200) from an outside environment passing through a protrusion (113) (shown hatched) corresponding to a transparent area and emerging from the cell as ray (1201) to illuminate an inside environment. Light incident on a concentrated particle area is diffusely reflected by white particles (11) in channel (133) in embodiment (203) as shown by incident and reflected rays (1205) and (1206) respectively. In cell (300) shown in FIG. 2a light incident on the concentrated particle area (20) is strongly absorbed by black charged particles (10). In cell (304) shown in FIG. 4 light incident on concentrated particle area (24) is both absorbed and diffusely reflected in the visible spectrum by red charged particles (12). Regardless of the colour of charged particles, light incident on the concentrated particle area is not significantly transmitted and so this area is described herein as attenuating.

FIG. 1b shows that in the second extreme light state the viewing face (150) of the light attenuator has a visible pattern of attenuating areas (20) abutting on (i.e. side-by-side with or juxtaposing) transparent areas (30) defined by the presence or absence respectively of the concentrated particles that in turn are defined by the polymer structure's channel (130) and protrusions (110) (the latter two are shown in FIG. 1c).

In FIG. 2a these attenuating (20) and transparent (30) abutting areas are arranged so that each area has one or more dimensions that are 0.3 mm or more (see (50) and (60)) and therefore visible or discernible or resolvable as parts (or elements) by eye. In addition, the centre-to-centre distance (40) of adjacent attenuating areas or the centre-to-centre distance (45) of adjacent transparent areas is 0.6 mm or more. The viewing face (150) has a plurality of abutting areas and centre-to-centre distances and they form a visible pattern across its area.

Similarly, in FIG. 4 the attenuating (24) and transparent (34) abutting areas are arranged so that each area has one or more dimensions that are 0.3 mm or more (scc (55) and (65)) and therefore visible by eye. In addition, the centre-to-centre distance (41) of adjacent attenuating areas or the centre-to-centre distance (46) of adjacent transparent areas is 0.6 mm or more. The viewing face (154) has a plurality of abutting areas and centre-to-centre distances and they form a visible pattern across its area.

The 0.6 mm centre-to-centre dimension is sufficiently large to be visible at 1.0M by a viewer with a visual acuity of 1.0 or higher as the viewing distance results in an angular resolution of two minutes of arc. The pattern is visible because the attenuating areas corresponding to the concentrated particles in the second light state form resolvable parts (or features) when they have a centre-to-centre distance of 0.6 mm or more and transparent area in the space between adjacent attenuating areas. A visual analogy can be made with the graduation pattern on a steel rule; graduations having a centre-to-centre distance of 0.5 mm (i.e. 0.5 mm divisions) are visible.

While the dimensions of each area of attenuating (20) and transparent (30) abutting areas should be at least 0.3 mm or more to be discernible to a viewer at 1.0M, and have a centre-to-centre dimension of at least 0.6 mm, it is also necessary that the dimension of the each area of attenuating (20) and transparent (30) abutting areas should not be so large that the pigment loading of the transparent area cannot be packed into the attenuating area. This is because, in most configurations, the area above the transparent area increases as the square of the dimension, while the surface area of the attenuating area, where the particles will be packed, increases roughly linearly with the dimension. If the dimension grows too big, the particles cannot be effective packed in the attenuating area, leading to a darker clear state. Larger dimensions are also found to require higher voltages to achieve good clearing. Experience with various sized of dimensions suggests that the area of attenuating (20) and transparent (30) abutting areas should not exceed 3 cm. The corresponding maximum centre-to-centre dimension is about 6 cm. Thus, each repeat of attenuating (20) and transparent (30) abutting areas should have a dimension (50, 55 and 60, 65) between 0.3 mm and 3 cm, while the centre-to-centre distance (40, 41) of adjacent attenuating areas or the centre-to-centre distance (45, 46) of adjacent transparent areas is between 0.6 mm and 6 cm.

In embodiments, in the second light state, and for a plurality of instances, the centre-to-centre distance of adjacent attenuating areas, or the centre-to-centre distance of adjacent transparent areas is in order of preference: 0.62 mm to 5.8 cms, 0.65 mm to 5.5 cms, 0.7 mm to 5.14 cms, 0.8 mm to 4.5 cms, 1.0 mm to 3.6 cms, and most preferably 1.25 mm to 3 cms, and in correspondence to the preceding, the abutting attenuating areas and transparent areas each have one or more dimensions that are in order of preference: 0.31 mm to 2.9 cms, 0.325 mm to 2.75 cms, 0.35 mm to 2.57 cms, 0.4 mm to 2.25 cms, 0.5 mm to 1.8 cms, and most preferably 0.625 mm to 1.5 cms.

In embodiments the transparent area in the face view is 60% or more of the total active (i.e., switchable) area, preferably 62% or more, more preferably 65% or more, and most preferably 70% or more. The attenuating area is the remainder in each case. The transparent areas, the attenuating areas, and accordingly the resolvable parts and pattern in the second light state, are defined by a device's polymer structure.

In an example shown in FIG. 2b, a vehicle is fitted with embodiments for its side windows and sunroof. The charged particles (10) are not drawn but the corresponding attenuating area (20) is shown. Occupants of the vehicle would typically have a viewing distance of 0.5M (or less) through these openings in the second light state. The angle subtended by an attenuating area (20) is indicated by (80) and the angle for transparent area (30) by the number (90). An abutted attenuating area (20) and transparent area (30) is shown subtending an angle (70). At 0.5M viewing distance this abutted area pair of (20)+(30) subtends over 4.1 minutes of arc or 4.1 times the minimum angular resolution of a viewer with a visual acuity of 1.0 when the distance (edge-to-edge) of the abutted areas is 0.6 mm or more. The angle was calculated as:

$$\text{Angle subtended} = \text{Tangent}(0.6/500)$$
$$= 0.0012 \text{ (in radians)}$$
$$= 4.125 \text{ (in arc minutes)}$$

The corresponding calculation for subtended angles (80) and (90) at the minimum 0.3 mm dimension within the visible pattern in embodiments is 2.06 minutes of arc:

$$\text{Angle subtended} = \text{Tangent}(0.3/500)$$
$$= 0.0006 \text{ (in radians)}$$
$$= 2.063 \text{ (in arc minutes)}$$

As a consequence of the subtended angles for (70), (80) and (90) being a multiple of the minimum resolution of a viewer (with acuity 1.0) there is an obvious visible pattern when viewing embodiment (200) at 0.5M. Attenuating area (20) (comprising black concentrated particles (10)) can be seen as a black grid (or array) with clear openings analogous with a metal mesh having comparable openings and walls. Objects viewed through the embodiment have a negligible perception of black hue because the viewer's eye does not integrate the black grid area with the view through the transparent areas.

By contrast, the motivation of the prior art electrophoretic, light attenuator devices that have polymer structure throughout their electro-optical layers is to arrange their structures so that the structures (or associated patterns in the light states defined by the structures) are sufficiently small that they cannot be perceived by a viewer. In the applicant's EP2976676, the size of apertures (transparent areas) and obstructions (light blocking areas) have their maximum size and pitch (analogous to the repeating centre-to-centre distance) determined by the resolution of a typical viewer's eye so that at a viewing distance of 0.5M, its areas subtend an angle of less than one arc minute and this equates to less than 0.145 mm to avoid a pattern being apparent to a viewer.

In embodiments, in the second light state, the centre-to-centre distance of attenuating areas or transparent areas (defined by the presence or absence respectively of the concentrated particles that in turn are defined by the polymer structure) can be random or have more than one value. In other embodiments the centre-to-centre distances repeat uniformly in a direction and are the same as the pitch of the repeating pattern that is visible by eye.

FIG. 2*a* shows the pitch (1040) of abutting attenuating and transparent areas in the top-to-bottom direction. It is longer than the pitch (1041) in the left-to-right direction. In embodiment (200) the shortest distance or width (61) of the transparent areas can be 75% or more of the pitch (1041) and the shortest distance (51) of the attenuating areas can be 25% or less. Preferably the limits for the preceding rule are 80% and 20% respectively and more preferably 85% and 15%. FIG. 4 shows the pitch (1045) of abutting attenuating and transparent areas for alternative embodiment (204).

In embodiment (200) the transparent areas (30) are discrete and the attenuating area (20) is contiguous, see FIG. 2*a*. The reverse relationship is shown by embodiment (204) in FIG. 4: the attenuating areas (24) are discrete and the transparent area (34) is contiguous. In both embodiments the centre-to-centre distance of adjacent discrete areas is easily identified (see (45) and (41) respectively). The corresponding centre-to-centre distance for the contiguous area relates to the area between the discrete areas as shown by dimension (40) in FIG. 2*a* and dimension (46) in FIG. 4. In this regard embodiments can be defined by a centre-to-centre distance for both its attenuating areas and its transparent areas.

In the second light state the visible pattern formed by the attenuating and transparent areas in a face of embodiments is superposed on the view through the face. The visible pattern is in the foreground and the view is in the background. The eye resolves the visible pattern as a grid (or array) and perceives it as a grid of opaque areas that are the colour of the particles. In embodiments this grid can be made indistinguishable on the face when switched to the first light state. The charged particles in the first light state spread uniformly and opposite the locations that receive the particles as they concentrate in the second light state. Preferably, the superposed visible pattern or grid (or array) is designed to be aesthetically acceptable (or pleasing) by selecting the design of the locations of the concentrated charged particles in the polymer structure.

An embodiment's polymer structure, including the locations of the concentrated charged particles, is formed at least in part in an embossing, moulding or replicating step. Examples of moulding techniques are described in the applicant's EP2976676 titled "An Electrophoretic Device Having a Transparent Light State". To minimize haze in embodiments the refractive index of the polymer structure (100, 103, 104) is matched to the ink's suspending fluid (15, 16, 17), preferably to within 0.005, more preferably, 0.002, and most preferably, 0.001.

The replicated polymer structure has depressions, channels, pits, recesses, or reservoirs corresponding to the attenuating areas and protrusions, funnel-like sloping surfaces, or a raised surface in between corresponding with the transparent areas. The shape of both areas in a face view as well as the centre-to-centre distance is defined by the polymer structure. Either area type (i.e., attenuating or transparent) can be monodisperse or have a distribution of sizes and/or shapes. Examples of devices having channels and protrusions can be found in the applicant's EP2976676; devices having reservoirs and funnel-like sloping surfaces in HP's U.S. Pat. No. 8,184,357; and, devices having recesses and raised surfaces in HP's U.S. Pat. No. 7,957,054. The latter refers to a dielectric layer with recesses but the dielectric layer is a polymer structure and its concentrated particles are located at recesses (or pits, voids, or holes) in the layer in its transparent light state. In an alternative embodiment the polymer structure provides walls that charged particles concentrate against in the second light state. These devices are referred to as dielectrophoretic and an example is shown in E Ink's US2018/0364542 A1.

In some embodiments the shape of areas is selected to minimize the opportunities for moiré patterns that would otherwise occur if an embodiment's opaque grid (i.e., strongly attenuating areas arranged in an array) is overlaid on a similar pattern in the background viewed through a face. To avoid or minimize moiré patterns the attenuating areas preferably avoid a pattern of continuous parallel lines. In this regard a honeycomb structure as shown in FIG. 2a is preferred as it is less likely to be similar to grid structures encountered in a background scene. But in more preferred embodiments a modulation function is applied to a geometric shape. For example, the polymer structure (110) shown in FIG. 1c in an alternative embodiment has the border of its hexagonal shaped protrusions (110) modulated with a Sine wave to have wave-like sides instead of flats. The visible pattern of this alternative embodiment is characterized by wave-like segments instead of straight segments and so less likely to cause moire patterns when viewing a scene.

In some embodiments two or more devices are stacked and to avoid moire patterns each device has a different grid (or array) pattern. In an embodiment example, a sunvisor in a vehicle comprises a stack of two devices to achieve very low light transmittance when both devices are operated in their respective maximum attenuating light states. The embodiment achieves a corresponding maximum light transmitting state when both devices are in their light transmitting states. To avoid moire patterns in some embodiments both devices' attenuating areas (and transparent areas) are precisely aligned, but, in preferred embodiments the shape of light attenuating areas is selected to be different between devices. For example, one device has a honeycomb structure for its attenuating area and the other device has a monodisperse shape such as spherical, or one whose border is modulated by a Sine wave.

In embodiment (203) shown in FIG. 3 the polymer structure (103) spaces apart the light attenuator's substrates using integrated posts (123). The posts (123) define the cell gap and the orthogonal distance between the substrates is shown as dimension (5). The cell is sealed all around with a polymer seal (not shown). Post (120) on polymer structure (100) shown in FIG. 1c has a similar function. In other embodiments the polymer structure uses polymer walls to space apart the light attenuator's substrates and divide the volume there between into a monolayer of discrete cavities filled with an electrophoretic ink. The walls in this case define the cell gap.

In embodiments the cell gap (dimension (5) in FIG. 3) is from 7.5 microns to 300 microns, preferably from 13.5 microns to 200 microns, more preferably from 16.5 microns to 150 microns, and most preferably from 18 microns to 125 microns.

Preferably, a colour layer is selectively applied to the tops of polymer walls and/or posts so that in a viewing face the colour of the wall area matches the colour and light transmission of the attenuating areas in the second light state. Preferably the polymer structure includes a sealing layer or sealing mechanism that seals the fluid within each cavity. The seal layer preferably bonds to the colour layer on the polymer walls (or incorporates the colour layer). In some embodiments sealed cavities are independent of one another and can be described as cells, and the light attenuator as comprising a monolayer of cells.

In some embodiments the polymer structure locates the concentrated charged particles against or by its polymer walls including in channels adjacent its walls in the second light state. In such embodiments there are concentrated particles on each side of a polymer wall section for the respective cavities each side. Preferably the polymer walls have an attenuating layer and are coloured to match the particles; then the attenuating area for the concentrated particles will appear contiguous on a face of the device and the transparent areas will be discrete. Optionally, the polymer walls can be transparent, and if so are preferably as narrow as possible and preferably the width is in the range: 15 microns to 75 microns. In the latter case the attenuating areas in the second light state are discontiguous.

In other embodiments the polymer structure locates the concentrated charged particles in discrete reservoirs that do not coincide with the walls in the second light state. The attenuating areas are discrete and surrounded by contiguous transparent area. Preferably the walls are as narrow as possible and remain transparent so that the attenuating area in the second light state appears contiguous. Alternatively, the walls may have a colour layer.

In more preferred embodiments the concentrated charged particles are in depressions or channels between protrusions in the polymer structure and the locations may or may not coincide with the walls. The transparent areas are discrete and the attenuating areas are contiguous. Preferably the walls have an attenuating layer in embodiments where they coincide with locations of the concentrated particles, or, are transparent where they do not.

Cavities can contain a single transparent area and a single attenuating area or a plurality of either, or a part of either. Cavities can be uniform and repeat with a pitch or have differences. The centre-to-centre distance between adjacent cavities can be greater than, equal to, or less than, the centre-to-centre distance of transparent or attenuating areas defined by the concentrated charged particles in the second light state. The polymer walls of cavities can also form a visible grid on a face of embodiments but this grid is not switchable. It will be appreciated that it is advantageous to have polymer walls that have an attenuating layer arranged adjacent the locations of concentrated particles where possible. Alternatively, it is advantageous to have transparent walls arranged predominantly in transparent areas of the second light state.

In some cells a colour mask (i.e., a colour layer) different to the colour of the charged particles is selectively applied to a surface of the polymer structure in the locations where particles are concentrated in the second light state (i.e. the attenuating areas). The colour mask areas correspond to the attenuating areas and consequently in embodiments form a visible pattern or grid. In the viewing face on the same side as the colour mask the colour of the locations masks the colour of the concentrated charged particles in the second light state. An embodiment having white charged particles can avoid diffuse reflection from its attenuating areas (i.e. the concentrated charged particles areas) in the second light state by masking these areas with a black mask printed on the polymer structure, or on a face of the substrate on the same side. Alternatively the colour mask could be applied to the opposing area on the polymer structure or the opposite substrate to mask from the other viewing face. Similarly, both sides can be selectively printed to mask or minimize diffuse reflection or transmission from the concentrated particle area in the second light state. The colour mask is defined in embodiments by the locations (130, 133, 134) in the polymer structure (100, 103, 104) that define the concentrated charged particles (10, 11) in the second light state and consequently is visible by eye when viewed from the face it is adjacent to.

In embodiments the electrophoretic ink can have one, two, or more types of charged particles including: positively charged, negatively charged, differing electrophoretic mobility, and/or different colours, or any combination of these. The charged particles have colourant including one or more of: a dye colorant, a pigment colourant, a strongly light scattering material, a strongly reflecting material, or a strongly absorbing material. In some embodiments the electrophoretic ink has two charged particles types, each with an electrophoretic mobility and colour different to the other but the same charge polarity. In the second light state the two types segregate as they concentrate at the locations in the polymer structure with one type masking the other with respect to the viewing faces on the same side. This is an alternative to applying a colour mask to the locations as described in the previous paragraph. A minority of black charged particles with higher electrophoretic mobility can be used to mask a different colour of charged particle such as a majority of white particles having a lower electrophoretic mobility.

Preferably light attenuators provide at least one light state intermediate the first and second states by moving the charged particles between the concentrating locations in the polymer structure and the opposite electrode to vary the degree of concentrating or spreading respectively. A visible pattern will be apparent in intermediate light states once particles begin to concentrate in the locations provided. In embodiments where the charged particles are a colour other than black (e.g., white) haze will be at a minimum in the second light state and increase the closer an intermediate light state is to the first light state. In some embodiments the first light state is very strongly hazy to provide a privacy function.

The invention claimed is:

1. A method of making a light attenuator comprising:
   providing a first transparent substrate comprising a first transparent electrode and a transparent polymer structure, the transparent polymer structure including a plurality of volumes defined by a transparent bottom and polymer walls, the polymer walls having sides and a top;
   applying a color layer to the tops of the polymer walls;
   disposing an electrophoretic ink into the plurality of volumes, the electrophoretic ink comprising charged particles dispersed in a transparent fluid;
   sealing the electrophoretic ink within the plurality of volumes with a sealing layer applied across the tops of the polymer walls and the color layer;
   providing a second transparent electrode adjacent the sealing layer, wherein an electric field applied between the first and second transparent electrodes causes the charged particles in the electrophoretic ink to move such that the light attenuator has two states:
      a first state in which the charged particles are distributed throughout the plurality of volumes, thereby providing reduced transmission between the first and second transparent substrates for light incident on the light attenuator; and
      a second state in which the charged particles are concentrated adjacent the sides of the polymer walls, thereby providing increased visible transmission between the first and second transparent substrates for light incident on the light attenuator as compared to the first state.

2. The method of claim 1, wherein the color of the color layer and the color of the charged particles is the same.

3. The method of claim 1, wherein the color of the color layer and the color of the charged particles is black or another dark color.

4. The method of claim 1, wherein the transparent polymer structure additionally includes locations adjacent the sides of the polymer walls for collecting the charged particles in the second state.

5. The method of claim 1, wherein the electrophoretic ink includes two types of charged particles, each with a different electrophoretic mobility and a different color.

6. The method of claim 1, further comprising bonding the sealing layer to the color layer.

* * * * *